April 12, 1966  C. A. MEAD ETAL  3,246,216
DUAL-ROLLER PROBE FOR MOISTURE CONTENT METER
Original Filed Sept. 9, 1958
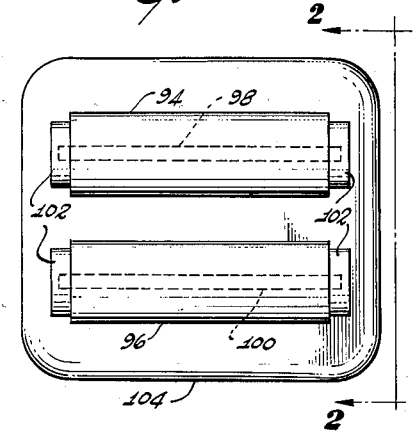
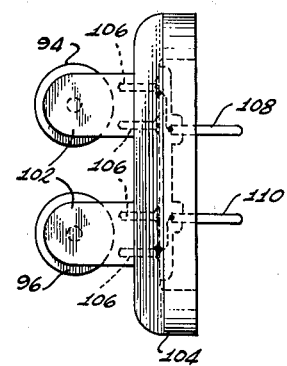
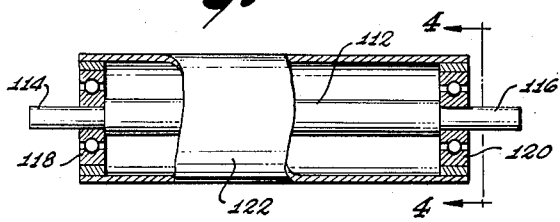
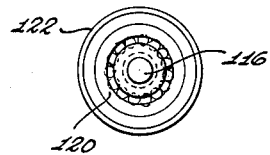
INVENTORS
CARVER A. MEAD
MARVIN L. McBRAYER
BY
Forrest J. Lilly
ATTORNEY

United States Patent Office 3,246,216
Patented Apr. 12, 1966

3,246,216
DUAL-ROLLER PROBE FOR MOISTURE
CONTENT METER
Carver A. Mead, Pasadena, and Marvin L. McBrayer, Alhambra, Calif., assignors to Moisture Register Company, Alhambra, Calif., a corporation of California
Original application Sept. 9, 1958, Ser. No. 759,930, now Patent No. 3,046,479, dated July 24, 1962. Divided and this application June 26, 1962, Ser. No. 221,641
2 Claims. (Cl. 317—246)

This application is a division of our prior application entitled—Moisture Content Meter—filed September 9, 1958, Serial No. 759,930, now Patent No. 3,046,479, and is directed particularly to a novel roller type of probe which is of especial advantage in measuring, for example, the moisture content of roll of paper while the roll is in motion. An object of the invention is the provision of such a probe.

Our invention relates generally to electrical moisture meters and more particularly to a novel and useful roller-type probe for a moisture content meter for measuring the moisture content of a wide variety of materials.

A still further object of our invention is to provide roller-type probes which are sensitive to the dielectric constant of a tested material.

Briefly, and in general terms, a moisture meter such as contemplated in the invention comprises a capacitance variable, dual-roller probe which, for example, may form part of the tank circuit of an electron-coupled oscillator, a center tuned discriminator connected as a load to the oscillator and producing a magnitude and polarity variable output voltage which is applied as a grid bias to one input of a differential amplifier, the other input being connectable to different range taps of a voltage divider, and a microammeter connected to the output of the differential amplifier to indicate the moisture content of material against which the probe is placed. Such a typical circuit is disclosed in our Patent No. 3,046,479, and will not be further described herein.

Our invention possesses other objects and features, some of which together with the foregoing, will be set forth in the following detailed description of a preferred embodiment of the invention. The invention will be more fully understood by reading the detailed description with joint reference to the attached drawings, in which:

FIGURES 1 and 2 are front and side elevational drawings, respectively, a roller type probe for use with rotating rolls of paper, for example; and FIGURES 3 and 4 are detail drawings of a tubular roller type electrode for a roller probe wherein conducting shells mounted on a shaft through bearings are used.

Frequently, it is desired to measure the moisture content of a rotating roll of paper, for example, without having to stop it in order to obtain an accurate reading. The novel roller probe shown in FIGURES 1 and 2 is especially suited for this purpose, and can also be used with a non-rotating roll. Two cylindrical rollers 94 and 96 of proper size (diameter) and parallel (lateral) separation serve as two electrodes which are placed against the curved surface of a rotating roll, and act as the two conducting bodies of a capacitor. The rollers 94 and 96 are preferably fabricated from anodized aluminum 3½ inches long and 1¼ inch in diameter, for example. An axial hole is centrally drilled in each roller to closely accommodate a ⅜ inch steel shaft so that the rollers can rotate freely. The ends of the steel shafts 98 and 100 are supported and fixed in four end plates 102 which are attached upright to a base plate 104 (of Bakelite) by screws 106. The end plates 102 can also be fabricated from anodized aluminum and each plate is partially drilled to provide a short hole for receiving an end of a steel shaft. The steel shafts can be fixed by means of a small set screw (not shown) in each end plate engaging the side of the end of a steel shaft. The steel shafts are mounted at the same level above the surface of the bakelite base plate 104 parallel to each other as shown. Banana type plugs 108 and 110 are screwed into the recessed bottom of the base plate 104 and are electrically connected to respective rollers through an end plate screw 106 (FIGURE 2) which attaches an end plate 102. It will be understood that the base plae 104, with the plugs 108 and 110, plugs into suitable receptacles on an instrument housing, not here shown. For an illustration of a suitable instrument housing, see our Patent No. 3,046,479. A good electrical contact is made by the long steel shaft portion which supports an aluminum roller. The aluminum to steel combination of materials also produces a highly satisfactory bearing arrangement. The end plates 102 are closely spaced to the aluminum roller ends and permit very little end play. Of course, the end plates 102 can be replaced by two wide end plates which can each mount corresponding ends of both rollers, and can be fabricated from non-conducting materials if suitable conducting paths are provided. It should be noted that rotation of the metallic rollers 94 and 96 does not affect circuit behavior because of the very high frequencies involved.

Where it is not desired that solid rollers be used, and that lighter rollers are employed to test rotating material, the novel tubular roller configuration illustrated in FIGURES 3 and 4 can be used in place of the solid rollers 94 and 96. A stationary shaft 112 of suitable conducting material such as aluminum can be supported on its two ends 114 and 116 which can be respectively mounted in a pair of end plates such as the end plates 102. Bearings 118 and 120 are pressed onto the ends 114 and 116, respectively, and rotatably mount a tubular, cylindrical conducting shell 122 of aluminum, for example, which fully encloses the inner, stationary shaft 112. In this way, the outer conducting shell 122 contacts and rotates with a roll of paper, for example, being tested. A version providing a non-conducting contact surface can be obtained by having the outer shell 122 constructed from printed circuit material. Thus, in FIGURE 3, the shell 122 would be of a plastic substance, with the inside surface thereof constituted of a metallic, conductive coating or layer thereon or thereagainst an electrical connection is obtained through the bearings 118 and 120, in this version, to the ends 114 and 116. Similarly, the rollers 94 and 96 in FIGURES 1 and 2 can be coated with a thin non-conducting layer of insulating plastic material if direct metallic contact is not desired.

It will be seen that in both of the above embodiments of the invention, the two rollers are disposed so that common sides thereof face away from the base plate 104, so as to be presented to the work, e.g., a rotating roll of paper. I may be said, in defining this arrangement, that the sides of the two rollers that are located on one side of a plane defined by the longitudinal axes of the rollers face away from the supporting body or base plate 104 for side-by-side presentation toward a rotating roll of paper or the like. It is to be understood that the particular embodiment of the invention described above and shown in the attached drawings is merely illustrative of and not restrictive of the broad invention, and that various changes in design, structure and arrangement may be made without departing from the spirit and scope of the broader of the appended claims.

We claim:
1. A roller capacitor probe for an electrical moisture meter for testing moisture content in a rotating roll of paper or the like, comprising:
   a support having a front side,
   a pair of parallel, electrically conductive metal, cylin- drical electrode rollers laterally spaced from one another so as to have an air gap for an electric field therebetween, the outer peripheral surfaces of said rollers being exposed and electrically conductive, said support including mounting means mounting said rollers on said front side of said support, with the longitudinal axes of said rollers parallel to one another, bearing means included in said mounting means supporting said rollers for free and independent rotation relative to one another, said mounting means positioning said rollers so that corresponding outer peripheral portions thereof, on the same side of a plane defined by said axes, are located forwardly of said front side of said support in a position for unobstructed spanning engagement with circumferentially spaced points of a roll of paper or the like, said support including electrical insulation which insulates said electrically conductive rollers from one another, and an electrical circuit lead element electrically coupled to each of said rollers and having means for connection to an electrical conductor, so as to form a roller capacitor probe.

2. A roller capacitor probe for an electrical moisture meter for testing moisture content in a rotating roll of paper or the like, comprising:

a support having a front side, a pair of parallel cylindrical electrode rollers laterally spaced from one another so as to have an air gap for an electric field therebetween, said rollers being comprised of a conductive metal with an anodizing coating on the exterior peripheral surface thereof, said support including mounting means mounting said rollers on said front side of said support, with the longitudinal axes of said rollers parallel to one another, bearing means included in said mounting means supporting said rollers for free and independent rotation relative to one another, said mounting means positioning said rollers so that corresponding outer peripheral portions thereof, on the same side of a plane defined by said axes, are located forwardly of said front side of said support in a position for unobstructed spanning engagement with circumferentially spaced points of a roll of paper or the like, said support including electrical insulation which insulates said electrically conductive rollers from one another, and an electrical circuit lead element electrically coupled to each of said rollers and having means for connection to an electrical conductor, so as to form a roller capacitor probe.

References Cited by the Examiner
UNITED STATES PATENTS

| | | | |
|---|---|---|---|
| 1,028,589 | 6/1912 | Moore | 193—37 |
| 1,055,113 | 3/1913 | Wittrock | 193—37 |
| 1,547,412 | 7/1925 | Corcker | 317—249 |
| 1,826,247 | 10/1931 | Heppenstall | 317—246 |
| 2,582,399 | 7/1952 | Smith | 317—246 |
| 2,687,792 | 8/1954 | Laugle | 193—37 |
| 2,691,223 | 10/1954 | Oberlin | 317—246 |
| 2,693,575 | 11/1954 | Greenwood et al. | 317—246 |
| 3,031,617 | 4/1962 | Paquette | 317—246 |

JOHN F. BURNS, *Primary Examiner.*